March 22, 1966   J. F. MULLER ETAL   3,241,852
FOLDING CART FOR OUTBOARD MOTORS
Filed July 17, 1964

JOSEPH F. MULLER,
THEODORE J. SPANKE,
INVENTORS.

BY Edmund F. Shanahan
ATTORNEY.

United States Patent Office 3,241,852
Patented Mar. 22, 1966

3,241,852
FOLDING CART FOR OUTBOARD MOTORS
Joseph F. Muller, 10820 Aqueduct Ave., Granada Hills, Calif., and Theodore J. Spanke, 1834 Dracena, Bakersfield, Calif.
Filed July 17, 1964, Ser. No. 383,466
5 Claims. (Cl. 280—40)

This invention relates generally to wheeled carts of the hand-truck type, and more particularly to such a cart which is foldable into a single plane, and which, when unfolded, can be used to transport both motor and gasoline tank, with both partially enclosed by protective panels.

The use of outboard motors for recreational boating, and also for some commercial boat applications, has become so widespread that outboard motor units probably outnumber all other types of marine power units in the world. In the United States alone, there are several million outboard motors used by their owners for recreational purposes only.

One of the features of outboard motors which accounts for their popularity has been portability. The motor can be transported separately from the hull, and both can be carried over beaches, or down wooded paths to a launching site. Unfortunately, outboard motors have grown in both weight and horse power, so that the most popular motors currently in use weigh over sixty pounds, a weight which the average office worker, or older man, finds rather excessive for transport over any substantial distance. Moreover, many motors are best used with a separate, auxiliary gasoline tank, and some with a separate electrical storage battery.

It is only in a few favored locations that the automobile and boat trailer can be brought immediately adjacent to the water. In the absence of any cart or similar means for transporting the motor and gasoline tank, the boat owner is restricted to these favored locations, and is unable to transport the motor over rough ground to a preferred launching location.

Moreover, it often happens that it is desirable to make a portage of boat and hull between two over-water trips. Such portage may be impossible, and certainly will be unpleasant without a suitable motor transport cart.

Presently known carts and hand-trucks are both unsuited and unsafe for the transport of the motor alone, and particularly for transport of both motor and gasoline tank. The motor should be transported in an upright position, with its lower parts, and propeller, freely suspended, and shielded from any unwanted collision with rough spots in the ground. The cart should be capable of rigidly free standing with the motor mounted on it, without danger of rolling or tipping over, accidentally.

Because of the high location of the center of gravity of the motor, it is imperative that the gasoline tank, and electrical storage battery, if any, be carried at the lowest points possible. This can only be done by transporting them immediately above ground, where they are in danger of being tipped by rocks and branches, unless surrounded by protective panelling.

It is important, the cart be capable of holding the motor in a rigid free-standing position, while the motor is serviced, and any part of the cart which might interfere with motor servicing must be removable.

The foregoing requirements and the additional requirement that the cart be very strong if it is not to break down under the weight of the larger and heavier motors, impose conditions which it would seem to be impossible to combine with collapsibility. Nevertheless, the cart must be fully collapsible into substantially a single plane, if it is to find widespread utility in the field for which it is designed. Only a collapsible cart can be carried in the trunk of a passenger auto, or between the thwarts of a canoe or fishing boat.

With the foregoing difficulties in mind, the present inventors have as their prime object the provision of a completely foldable cart for the transport, within partial enclosure of both motor and gasoline tank.

It is a second major object of the invention to provide a folding cart which locks rigidly in unfolded position, and is capable of free standing with a heavy motor mounted on a mounting block two feet or more above the ground.

The foregoing and other objects will best be understood from the following description read in connection with the drawings of one preferred specific embodiment of the invention, in which:

FIGURE 1 is a perspective view of a folding cart (partially broken away to accommodate the illustration) as it appears in unfolded standing position ready for transport of a motor;

FIGURE 2 illustrates a detail of a latch means for retaining a cart handle in desired traveling position;

FIGURE 3 is a detail side elevational view, partially broken away, showing the construction of lock means employed to retain side panels of the cart in open position;

FIGURE 4 is a horizontal sectional view, as viewed in the direction of the arrows 4—4 in FIGURE 3;

FIGURE 5 is a horizontal sectional view of a corner detail of the cart as viewed in the direction of the arrow 5 in FIGURE 1, showing the wheel mounting, but with the wheel partially broken away for the purposes of illustration;

FIGURE 6 is a perspective view of the cart as it appears in a fully folded condition; and FIGURE 7 is a perspective view from the rear of the lower right hand corner of the cart, in unfolded position, as viewed approximately in the direction of the arrows 7 of FIGURE 1.

In FIGURE 1, the numeral 10 is used to indicate the cart generally. An outboard motor 11 is suggested in phantom line, as it would appear when mounted in the cart 10.

The cart is seen to be an assembly of several foldable or movable parts on a main frame 12, which is comprised principally of right and left tubular side members 13 and 14, respectively, and transverse panels 15 and 16. A transverse strengthening bar may also be provided.

The upper panel 15 has a motor mounting block 20 molded to its front face, and the panel may, therefore, be referred to as the motor-mounting panel. A shelf 21, for the transport of the gasoline tank and also for service as a protective shield to the lower part of motor 11, is hingeably mounted by horizontal transverse hinge 22 to the lower edge of the lower panel 16, which latter may, therefore, be referred to as the shelf-mounting panel. The shelf 21 is locked in transport position by means of side panels 23 and 24 which also provide lateral protection to both the motor 11 and any gasoline tank or battery transported on shelf 21.

Side panels 23 and 24 fold downwardly and inwardly on side hinges 25 and 26, so as to rest on the shelf 21, and be nestable with it, when it is folded up in the folded position illustrated in FIGURE 6.

It will be seen that the shelf 21 is provided with side flanges 29, which limit the unfolding of side panels 23 and 24 to a vertical position, in which position they may be locked by a pair of tubular side panel locks 31 and 32, which are vertically reciprocable on the tubular side members 13 and 12, respectively. The side locks 31 and 32 have a forwardly projecting portion 33, which is slotted to receive an upwardly projecting tongue 34 on side panel 24. When lowered into locking position as illustrated in FIGURE 1, side panel lock 32 is retained in location by a spring detent button 35, contained within tubular member 12 and illustrated in detail in FIGURES 3 and 4. It will be understood that the construction of side panel lock 31 and its cooperation with side panel 23 is identical.

When unfolded, the cart 10 may be rolled along on a pair of wheels 41 and 42, both being seen in the folded position in FIGURE 6, which wheels are mounted rotatably on stub shafts, as indicated at 41a in FIGURE 5, which are mounted on folding wheel brackets 43 and 44. Wheel brackets 43 and 44 rotate as indicated in FIGURE 5 by the arrow 45 on vertical-axis hinges 47 and 48, which are welded or otherwise attached to the tubular side members 12 and 13, respectively.

When in open position, the wheel brackets 43 and 44 are braced laterally by means of a pair of bracket braces, only the right brace 50 being illustrated in the detailed perspective view of FIGURE 7. It will be understood that the left brace, not illustrated, is identical, but opposite in hand.

The brace 50 is pivotally mounted by means of pivot mounting 51 to the inside face of the wheel bracket 44. The opposite end of brace 50 is pivotally mounted in a slide block 52, which slides in a horizontal channel track 53 welded to the back face of the lower transverse frame panel 16.

In open position, as illustrated in FIGURE 7, the slide block 52 may be locked in open position by folding down hinged retainer 54, about horizontal-axis hinge 55.

When the two wheel brackets 43 and 44 are folded, as illustrated in FIGURE 6, the two slidable blocks 52 meet in the middle of the channel 53 as illustrated in FIGURE 6.

The handles 61 and 62 are pieces of curved tubing, with suitable grips as at 63, which have stems of reduced cross section as seen in FIGURE 2, which stems are received in the upper open ends of tubular side members 12 and 13, and are locked therein for travel position by means of a latch 65, which is preferably spring actuated as by a contained spring 66.

However, when it is desired to completely fold the cart 10 for portability in an automobile or boat, as illustrated in FIGURE 6, the handles 61 and 62 are removed from tubular side members 12 and 13, by releasing the latches 65, and are slipped into handle mounting brackets 66 and 67, and 68 and 69 on the back of frame 12.

Preferably, the side locks 31 and 32 perform a double function: locking side panels 23 and 24 in unfolded position for transport use of cart 10; or locking shelf 21 in folded position of FIGURE 6 by hooking of tongues 34 over notches 34a provided in shelf 21.

It will be seen, also, that the cart 10 will provide a very convenient supporting stand for working on a motor 11, as illustrated in FIGURE 1, if the handles 61 and 62 are merely removed and placed in their storage brackets 66 to 69, as illustrated in FIGURE 6.

Although we have described and illustrated in detail one preferred specific embodiment of the invention, it will be understood that it is not intended to limit the scope covered by a patent to the details illustrated and described. On the contrary, variations and modifications may be made without departing from the scope of the invention as described in the appended claims.

What is claimed is:

1. A folding cart for outboard motors, which cart includes:
   a rectangular frame comprising right and left side members, and upper and lower transverse panels;
   a motor-mounting block on the forward side of said upper transverse panel;
   a tank-transport shelf foldably mounted in front of said lower transverse panel by means of a transverse hinge along the lower edge of said shelf;
   side panels hingeably mounted at each side of said shelf, each of said side panels being disposed to lie along the adjacent side member, when said panel is unfolded into an opened upright position;
   a side panel lock vertically reciprocable on each of said side members, each lock engaging one of said side panels in unfolded position;
   a pair of wheel brackets hingeably mounted near the lower portions of said side members and adapted to fold inwardly against the back of said lower transverse panel;
   latch means associated with said wheel brackets for locking said brackets in an unfolded position for transport;
   and a pair of transport wheels rotatably mounted on said wheel brackets.

2. A folding cart for outboard motors, which cart includes:
   a rectangular frame comprising right and left tubular side members, and upper and lower transverse panels;
   a motor-mounting block on the forward side of said upper transverse panel;
   a tank-transport shelf foldably mounted in front of said lower transverse panel by means of a transverse hinge along the lower edge of said shelf;
   side panels hingeably mounted at each side of said shelf, each of said side panels being disposed to lie along the adjacent side member, when said panel is unfolded into an opened upright position;
   a side panel lock vertically reciprocable on each of said side members, each lock engaging one of said side panels in unfolded position;
   a pair of wheel brackets hingeably mounted on the lower portions of said side members and adapted to fold inwardly against the back of said lower transverse panel;
   a pair of collapsible bracket braces extending from the back of said lower panel to the inner sides of said wheel brackets;
   and a transport wheel rotatably mounted on the outer side of each of said wheel brackets.

3. A folding cart for outboard motors, which cart includes:
   a rectangular frame comprising right and left tubular side members, and upper and lower transverse panels;
   a motor-mounting block on the forward side of said upper transverse panel;
   a tank-transport shelf foldably mounted in front of said lower transverse panel by means of transverse hinge along the lower edge of said shelf;
   side panels hingeably mounted at each side of said shelf, each of said side panels being disposed to lie along the adjacent side member, when said panel is unfolded into an opened upright position;
   a side panel lock vertically reciprocable on each of said side members, each lock having means for selectively engaging one of said side panels or said shelf;
   locking detent means in each said tubular side members for engaging and releasably holding one of said side panel locks in position for locking;
   a pair of wheel brackets hingeably mounted on the lower portions of said side members and adapted to fold inwardly against the back of said lower transverse panel;
   a pair of collapsible bracket braces extending from the back of said lower panel to the inner sides of said wheel brackets;
   a latch means for locking said brackets in an unfolded position for transport;
   and a transport wheel rotatably mounted on the outer side of each of said wheel brackets.

4. A folding cart for outboard motors, which cart includes:

a rectangular frame comprising right and left tubular side members, and upper and lower transverse panels;

a motor-mounting block on the forward side of said upper transverse panel;

a tank-transport shelf foldably mounted in front of said lower transverse panel by means of transverse hinge along the lower edge of said shelf;

side panels hingeably mounted at each side of said shelf, each of said side panels having a vertical tongue disposed to lie along the adjacent side member, when said panel is unfolded into an opened upright position;

a side panel lock vertically reciprocable on each of said side members, each lock having a slot for reception of one of said tongues;

locking detent means in each tubular side members for engaging and releasably holding one of said side panel locks in position for locking one of said side panels;

a pair of wheel brackets hingeably mounted on the lower portions of said side members and adapted to fold inwardly against the back of said lower transverse panel;

a pair of collapsible bracket braces extending from the back of said lower panel to the inner sides of said wheel brackets;

a latch pin means associated with each of said wheel brackets for locking each said bracket in an unfolded position for transport;

and a transport wheel rotatably mounted on the outer side of each of said wheel brackets.

5. A folding cart for outboard motors, which cart includes:

a rectangular frame comprising right and left tubular side members, and upper and lower transverse panels;

a motor-mounting block on the forward side of said upper transverse panel;

a tank-transport shelf foldably mounted in front of said lower transverse panel by means of a transverse hinge along the lower edge of said shelf;

side panels hingeably mounted at each side of said shelf, each of said side panels having a vertical tongue disposed to lie along the adjacent side members, when said panel is unfolded into an opened upright position;

a side panel lock vertically reciprocable on each of said side member, each lock having a slot for reception of one of said tongues;

locking detent means in each said tubular side members for engaging and releasably holding one of said side panel locks in position for locking one of said side panels;

a pair of handle members, one received into each of said tubular side members at the elevation of said motor mounting block;

handle latches on said tubular side members for retaining said handles in position thereon;

handle storage brackets on the back of said frame below the level of said motor mounting block for storing said handles adjacent to the plane of said frame, when said handles are removed from said tubular side members;

a pair of wheel brackets hingeably mounted on the lower portions of said side members and adapted to fold inwardly against the back of said lower transverse panel;

a pair of collapsible bracket braces extending from the back of said lower panel to the inner sides of said wheel brackets;

a latch pin means associated with each of said wheel brackets for locking each said bracket in an unfolded position for transport;

and a transport wheel rotatably mounted on the outer side of each of said wheel brackets.

References Cited by the Examiner
UNITED STATES PATENTS

| | | | |
|---|---|---|---|
| 2,574,743 | 11/1951 | King | 280—63 X |
| 2,843,393 | 7/1958 | Dahlander | 280—47.18 |
| 3,041,084 | 6/1962 | Stehman et al. | 280—47.24 |
| 3,166,339 | 1/1965 | Earley | 280—36 |

BENJAMIN HERSH, *Primary Examiner.*

M. S. SALES, *Assistant Examiner.*